(12) United States Patent (10) Patent No.: US 12,626,238 B2
Agashe (45) Date of Patent: May 12, 2026

(54) SYSTEM FOR SECURE TRANSACTION PROCESSING AND A METHOD THEREOF

(71) Applicant: Mandar Agashe, Maharashtra (IN)

(72) Inventor: Mandar Agashe, Maharashtra (IN)

(73) Assignee: AGASHE GLOBAL LLC, Austin, TX (US)

( * ) Notice: Subject to any disclaimer, the term of this patent is extended or adjusted under 35 U.S.C. 154(b) by 228 days.

(21) Appl. No.: 18/037,877

(22) PCT Filed: Dec. 20, 2022

(86) PCT No.: PCT/IB2022/062520
§ 371 (c)(1),
(2) Date: May 19, 2023

(87) PCT Pub. No.: WO2023/119144
PCT Pub. Date: Jun. 29, 2023

(65) Prior Publication Data
US 2024/0378578 A1 Nov. 14, 2024

(30) Foreign Application Priority Data
Dec. 22, 2021 (IN) .............................. 202121060001

(51) Int. Cl.
*G06Q 20/20* (2012.01)
*G06Q 20/40* (2012.01)
(52) U.S. Cl.
CPC ....... *G06Q 20/206* (2013.01); *G06Q 20/4012* (2013.01); *G06Q 20/40145* (2013.01); *G06Q 20/4018* (2013.01)
(58) Field of Classification Search
CPC ............. G06Q 20/4014; G06Q 20/326; G06Q 20/425; G06Q 20/401; G06Q 30/0601
(Continued)

(56) References Cited

U.S. PATENT DOCUMENTS

2012/0030044 A1* 2/2012 Hurst ................... G06Q 20/326
705/16
2012/0030047 A1* 2/2012 Fuentes ............... G06Q 20/326
705/26.1
(Continued)

FOREIGN PATENT DOCUMENTS

WO 2023119144 A1 6/2023

OTHER PUBLICATIONS

Gupta, Saket Kumar; International Search Report and Written Opinion of the International Searching Authority issued in Int'l. Pat. App. No. PCT/IB2022/062520; Mar. 29, 2023; 10 pages.

*Primary Examiner* — Olusegun Goyea
(74) *Attorney, Agent, or Firm* — Blueshift IP; Robert Plotkin

(57) ABSTRACT

The present disclosure discloses a system (100) and method (200) for secure transaction processing. The system (100) comprises a payment application (102), a memory (106), and a transaction server (108) hosting the application (102). The application (102) facilitates a registered user to generate a request for initiating a payment transaction. The memory (106) stores a list of identifiers associated with registered users and registration details corresponding to each user. The transaction server (108) generates a first one-time verification code/PIN based on the transaction request and sends it to the application (102). The transaction server (108) receives a second verification code/PIN via a second user interface (20), compares the two codes/PINs, and sends transaction data to the issuing bank (30) of the first user, via an acquirer bank (40), for the completion of the payment transaction when the codes/PINs match. The system (100) enables users to carry out payment transactions without entering their sensitive financial accounts.

20 Claims, 23 Drawing Sheets

(58) Field of Classification Search
USPC ................................................. 705/26.1, 39
See application file for complete search history.

(56) References Cited

U.S. PATENT DOCUMENTS

| | | | | |
|---|---|---|---|---|
| 2013/0054469 A1* | 2/2013 | Agashe | ................. | G06Q 20/20 |
| | | | | 705/67 |
| 2013/0212007 A1* | 8/2013 | Mattsson | ........... | G06Q 20/4014 |
| | | | | 705/39 |
| 2020/0175492 A9* | 6/2020 | Jain | ........................ | G06Q 20/34 |
| 2020/0265420 A1* | 8/2020 | Hamdan | ................ | G06Q 40/02 |
| 2021/0056537 A1* | 2/2021 | Agashe | ................ | G06Q 20/351 |

* cited by examiner

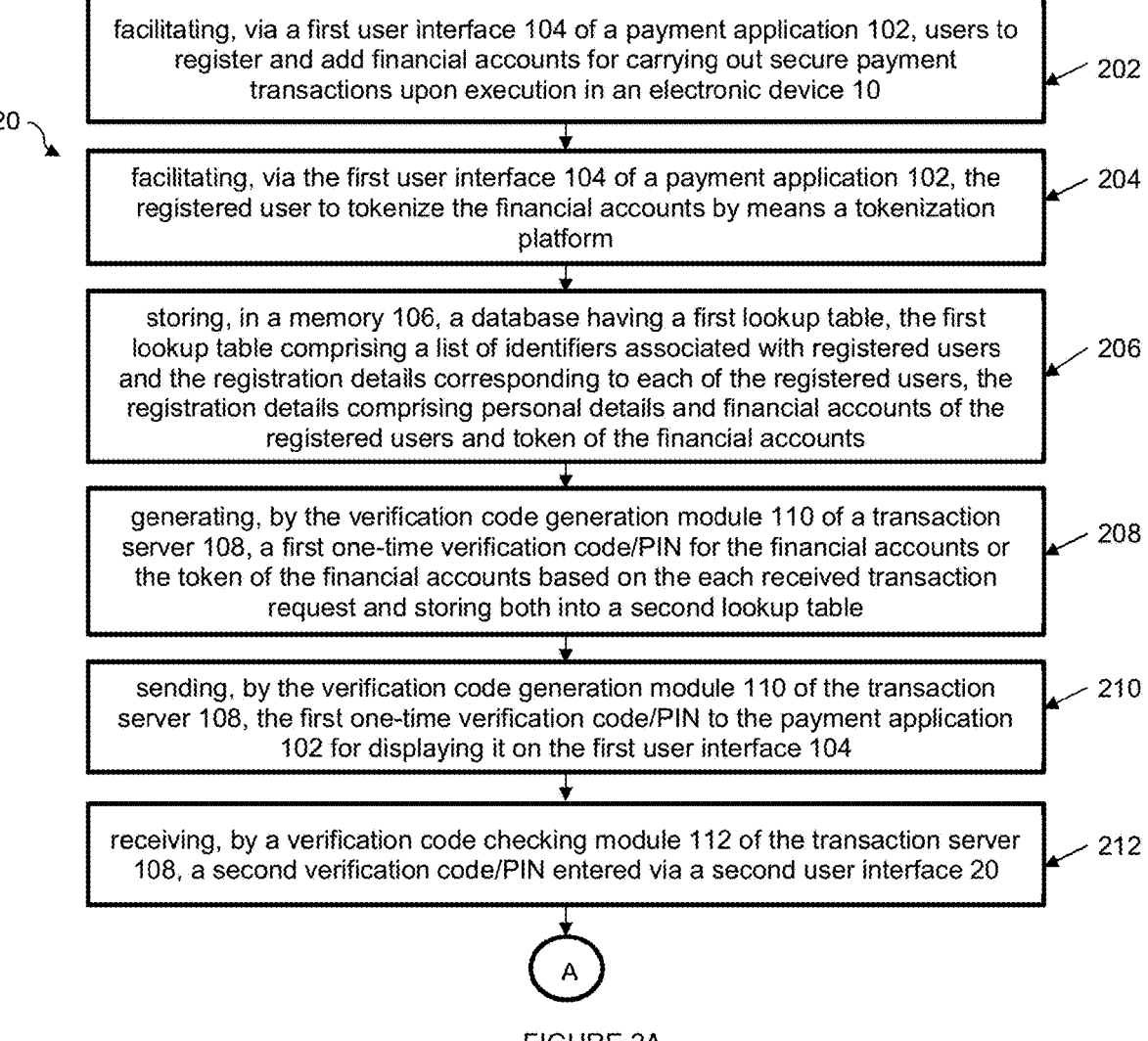

20 facilitating, via a first user interface 104 of a payment application 102, users to register and add financial accounts for carrying out secure payment transactions upon execution in an electronic device 10   202 facilitating, via the first user interface 104 of a payment application 102, the registered user to tokenize the financial accounts by means a tokenization platform   204 storing, in a memory 106, a database having a first lookup table, the first lookup table comprising a list of identifiers associated with registered users and the registration details corresponding to each of the registered users, the registration details comprising personal details and financial accounts of the registered users and token of the financial accounts   206 generating, by the verification code generation module 110 of a transaction server 108, a first one-time verification code/PIN for the financial accounts or the token of the financial accounts based on the each received transaction request and storing both into a second lookup table   208 sending, by the verification code generation module 110 of the transaction server 108, the first one-time verification code/PIN to the payment application 102 for displaying it on the first user interface 104   210 receiving, by a verification code checking module 112 of the transaction server 108, a second verification code/PIN entered via a second user interface 20   212

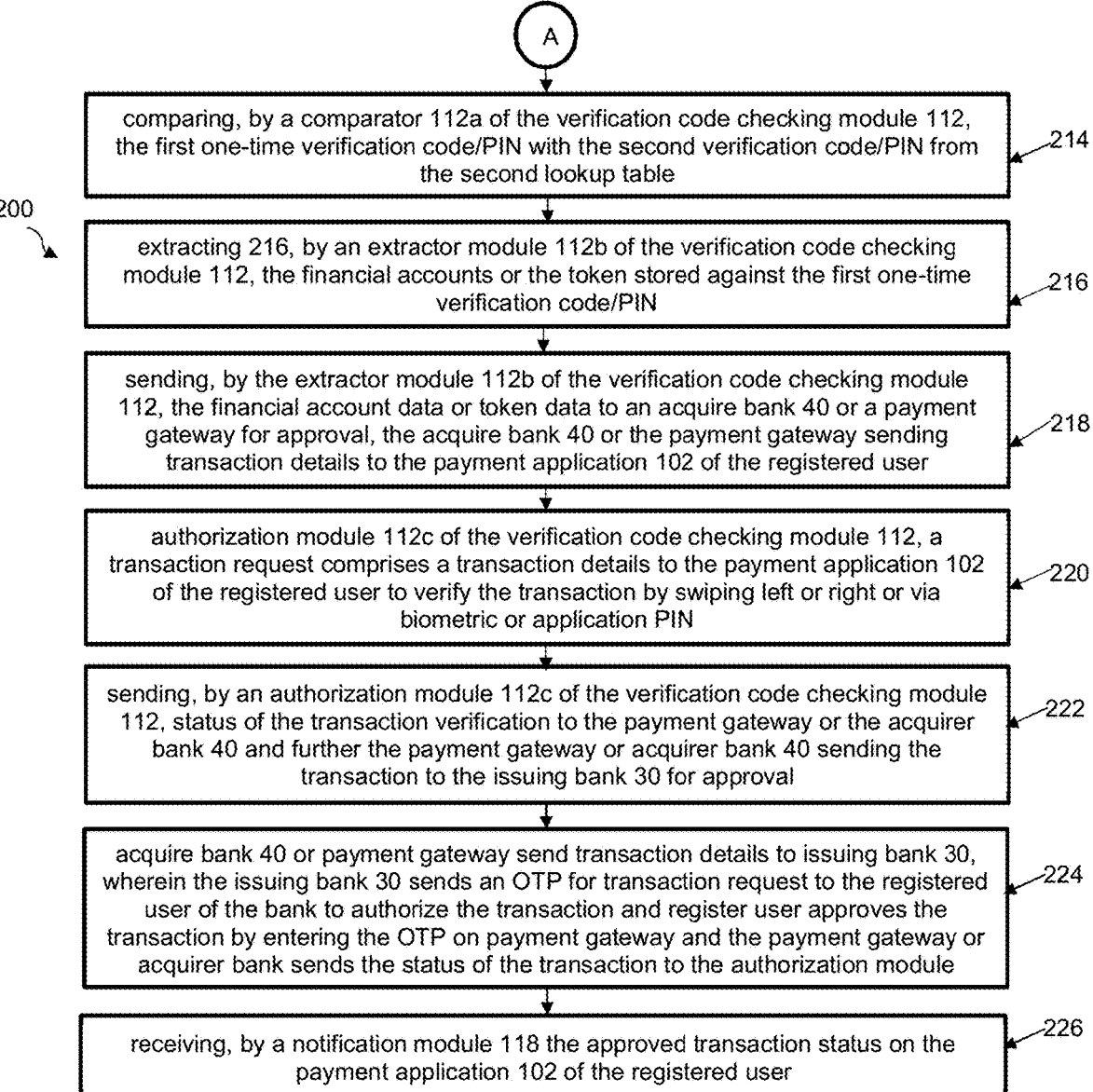

200

(A)

comparing, by a comparator 112a of the verification code checking module 112, the first one-time verification code/PIN with the second verification code/PIN from the second lookup table _214 extracting 216, by an extractor module 112b of the verification code checking module 112, the financial accounts or the token stored against the first one-time verification code/PIN _216 sending, by the extractor module 112b of the verification code checking module 112, the financial account data or token data to an acquire bank 40 or a payment gateway for approval, the acquire bank 40 or the payment gateway sending transaction details to the payment application 102 of the registered user _218 authorization module 112c of the verification code checking module 112, a transaction request comprises a transaction details to the payment application 102 of the registered user to verify the transaction by swiping left or right or via biometric or application PIN _220 sending, by an authorization module 112c of the verification code checking module 112, status of the transaction verification to the payment gateway or the acquirer bank 40 and further the payment gateway or acquirer bank 40 sending the transaction to the issuing bank 30 for approval _222 acquire bank 40 or payment gateway send transaction details to issuing bank 30, wherein the issuing bank 30 sends an OTP for transaction request to the registered user of the bank to authorize the transaction and register user approves the transaction by entering the OTP on payment gateway and the payment gateway or acquirer bank sends the status of the transaction to the authorization module _224 receiving, by a notification module 118 the approved transaction status on the payment application 102 of the registered user _226

FIGURE 2B

SYSTEM FOR SECURE TRANSACTION PROCESSING AND A METHOD THEREOF

FIELD

The present disclosure generally relates to payment systems. More particularly, the present disclosure relates to a system and method for secure financial transaction processing.

BACKGROUND

The background information herein below relates to the present disclosure but is not necessarily prior art.

Typically, point-of-sale or automatic teller machine (ATM) based payment systems require users to use their credit/debit/pre-paid cards to carry out monetary transactions. Similarly, internet-based payment systems require users to use their financial details such as credit/debit card information, internet banking login credentials, or login ID, and password of a financial service like PayPal to carry out online monetary transactions. Internet-based payment systems provide a person with remote access to his/her financial account and enable the person to carry out a transaction without walking into a bank and without using paper-based transaction methods.

However, a user performing a point-of-sale (POS), an ATM-based or an internet-based payment transaction is required to either insert a payment card into the merchant's Point of Sale (POS) machine or ATM or manually enter his/her financial details at a service application interface or a merchant website. Further, these websites/interfaces may save some of the financial details such as card numbers either directly or as a token, even to store the card as a token in card on file service, the customer has to enter complete card details at least once on the website, where the data can be stolen. The other details such as the Card Verification Value (CVV) are required to be entered every time the user wishes to transact. This exposes the user's financial data to merchants or to the third-party service providers which increase the risk of transactional fraud. Further, sensitive information such as the bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs are usually transmitted through public internet networks. Such transmissions are often prone to various types of hacking attacks due to which the confidentiality of the financial information is liable to be compromised.

Therefore, there is a need for a system and method for secure transaction processing which alleviates the above-mentioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a system for secure transaction processing and a method thereof.

Another object of the present disclosure is to provide a system for secure transaction processing that does not require a user to enter financial accounts (e.g., number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs) to carry out payment transactions.

Still another object of the present disclosure is to provide a system for secure transaction processing and a method thereof; A system for secure transaction processing and a method thereof that offer the user a safe and convenient way of performing transactions.

Yet another object of the present disclosure is to provide a system for secure transaction processing and method thereof that reduce the likelihood of exposure to hacking attacks.

Still another object of the present disclosure is to provide a system for transaction processing and method thereof that enable users to perform transactions at a point-of-sale (POS) machine or an automatic teller machine (ATM) without using a financial card.

Other objects and advantages of the present disclosure will be more apparent from the following description when read in conjunction with the accompanying figures, which are not intended to limit the scope of the present disclosure.

SUMMARY

The present disclosure envisages a system for facilitating secure transaction processing. The system comprises a payment application, a memory, and a transaction server hosting the payment application. The application is configured to provide a first user interface, upon execution in an electronic device, to facilitate users to register and add financial accounts for carrying out secure payment transactions. The payment application is further configured to facilitate a registered user to tokenize the financial accounts by means of a tokenization platform. The memory is configured to store a database having a first lookup table. The first lookup table comprises a list of identifiers associated with registered users and the registration details corresponding to each of the registered users, wherein the registration details comprise personal details and financial accounts of the registered users and token of the financial accounts.

The personal details are selected from the group consisting of name, mobile number, email ID, and identity-related information. The financial accounts are selected from the group consisting of bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs and/or token of financial accounts.

The verification code generation module is configured to generate a first one-time verification code/PIN for the financial accounts or the token of the financial accounts based on each received transaction request. The first one-time verification code/PIN can be a numeric code or an alphanumeric code. The verification code generation module is further configured to store both into a second lookup table. The verification code generation module is further configured to send the first one-time verification code/PIN to the payment application to display it via the first user interface.

The verification code checking module comprises a comparator, an extractor module, and an authorization module. The comparator is configured to receive a second verification code/PIN entered via a second user interface and compare the first one-time verification code/PIN with the second verification code/PIN from the second lookup table. The extractor module is configured to extract the financial accounts or the token of the financial accounts stored against the first one-time verification code/PIN. The extractor module is further configured to send the financial account data or token data to an acquirer bank or a payment gateway for approval. Further, the acquirer bank or the payment gateway sends transaction details to the payment application of the registered user.

The authorization module is configured to send a transaction request comprising transaction details to the payment application of the registered user to verify the transaction by swiping left or right or via biometric or application PIN. The authorization module is further configured to send the status of the transaction verification to the payment gateway or the acquirer bank and further the payment gateway or the acquirer bank sends the transaction to the issuing bank for approval and/or the acquirer bank or payment gateway sends transaction details to issuing bank, wherein the issuing bank sends an OTP for transaction request to the registered user of the bank to approve the transaction. The register user approves the transaction by entering the OTP on payment gateway and the payment gateway or acquirer bank sends the status of the transaction to the authorization module.

The notification module is configured to cooperate with the authorization module to receive the approved transaction status on the payment application of the registered user. The transaction data comprises a register user identifier, at least one of a transaction identifier, the financial account of the registered user, the transaction amount, details of the online/offline merchant or ATM, or one or more registration details of a second registered user with whom the payment transaction is being performed.

Additionally, the issuing bank checks the transaction data received from the extractor module and performs a second-level user authentication by generating and sending a one-time password to the electronic device of the registered user of the bank. The registered user may enter the password received on the electronic device on payment gateway, for example, by SMS or email, via the first user interface or the second user interface. The issuing bank can then check whether the password received from the registered user of the bank is the same as the generated password and authenticate the user.

In an embodiment, the memory is implemented as a storage area on the transaction server. Alternatively, the memory is implemented as an independent storage device communicatively coupled to the transaction server.

In an embodiment, the transaction server comprises a registration module is configured to receive the registration details from the users via the first user interface and further configured to register the users by creating unique identifiers associated with the users and storing the registration details with the unique user identifiers in the first lookup table. The registration module is configured to store the registration details in an encrypted form by means of an encryption engine.

The transaction server further comprises a login module which is configured to facilitate a user to generate and set login credentials via the first user interface, and is further configured to perform authentication of the registered user based on the login credentials before allowing the registered user to use the payment application to initiate the payment transaction. The login credentials may be selected from the group consisting of a login ID and password, a pre-set PIN, and a biometric signature of the registered user including at least one of fingerprint, facial biometrics, iris pattern, retina pattern, finger vein pattern, palm vein pattern, and voice sample.

In an embodiment, the transaction data comprises a register user identifier, at least one of a transaction identifier, the financial account of the registered user, the transaction amount, details of the online/offline merchant or ATM, or one or more registration details of a second registered user with whom the payment transaction is being performed.

The notification module is configured to receive a transaction status message from the payment gateway or acquirer bank of the second registered user and is further configured to notify the registered user and the second registered user about the status of transaction via the first user interface and the second user interface, respectively.

In an embodiment, the system facilitates the user to securely perform online, e-commerce, point-of-sale merchant, peer-to-peer (P2P), and automatic teller machine (ATM) transactions.

The present invention further envisages a method for secure transaction processing.

BRIEF DESCRIPTION OF THE ACCOMPANYING DRAWING

A system for secure transaction processing and method thereof of the present disclosure will now be described with the help of the accompanying drawing, in which:

FIGS. 2A and 2B illustrate a flow diagram of a method for facilitating secure transaction processing, in accordance with the present disclosure;

LIST OF REFERENCE NUMERALS

Figure 1:
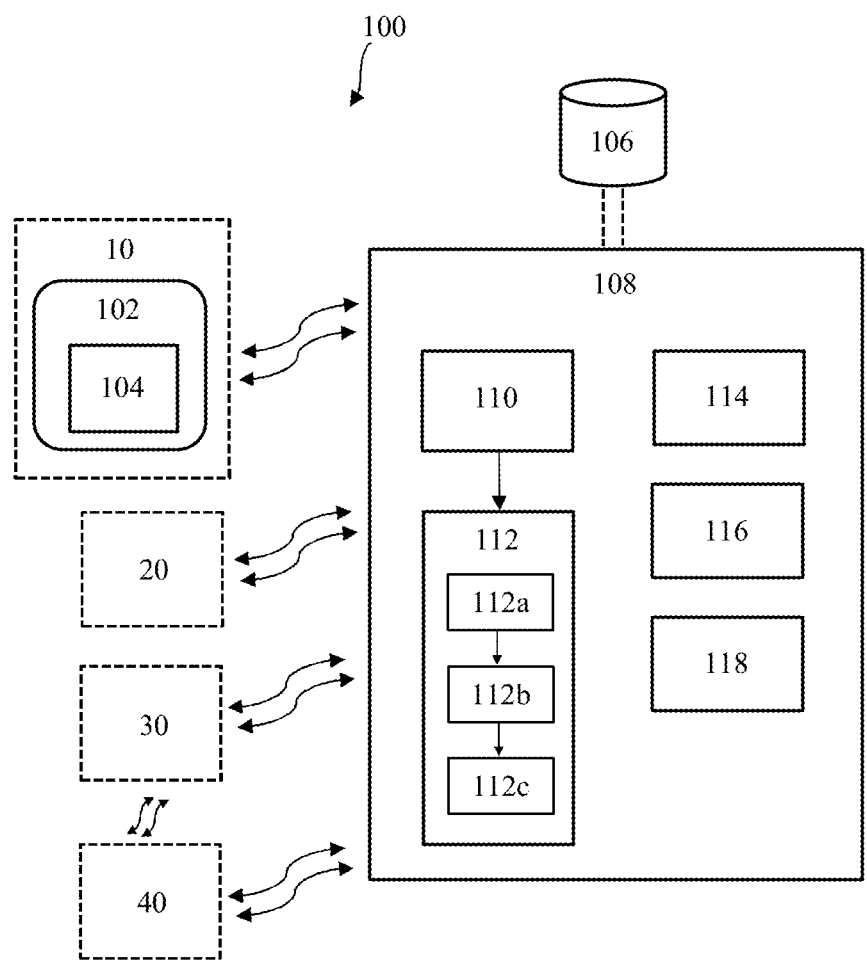
FIG. 1 illustrates a block diagram of a system for facilitating secure transaction processing, in accordance with the present disclosure.
Figure 3A:
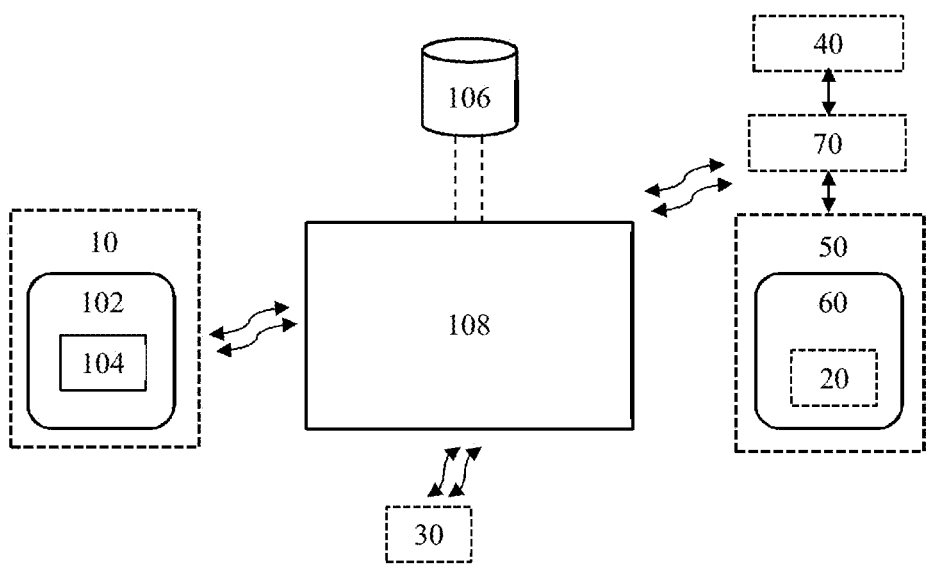
FIG. 3A illustrates a block diagram of the system of FIG. 1 for secure transaction processing between a customer and a merchant, in accordance with the present disclosure.
Figure 3B:
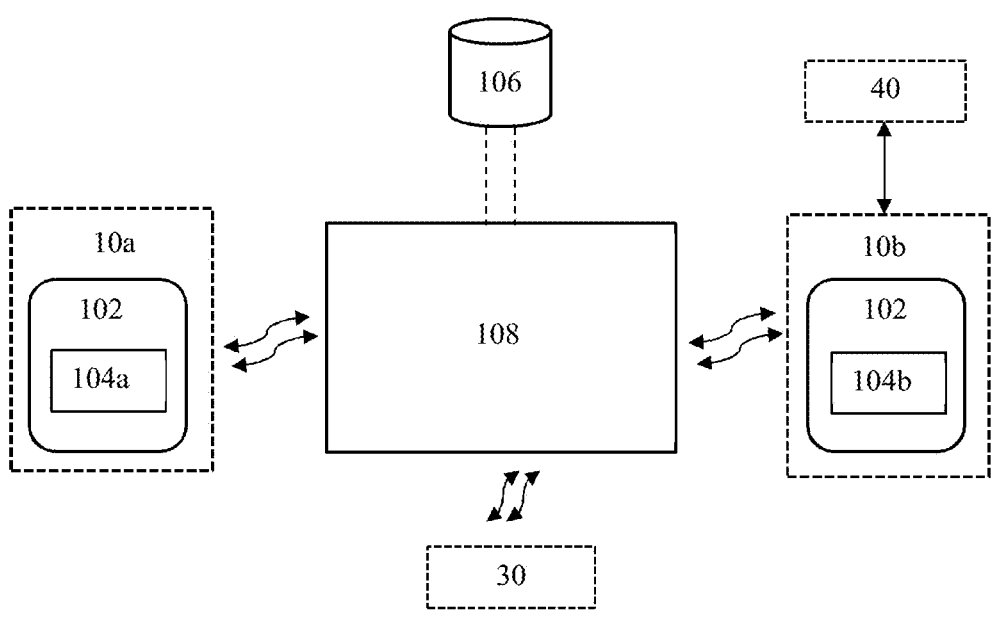
FIG. 3B illustrates a block diagram of the system of FIG. 1 for secure person-to-person (P2P) transaction processing, in accordance with the present disclosure.

100—System
10/50—Electronic device
10a—Electronic device of a first user
10b—Electronic device of a second user
20—Second user interface
30—Issuing bank
40—Acquirer bank
60—E-commerce website
70—Merchant server
102—Application
104—First user interface 104*a*—Application interface of a first user
104*b*—Application interface of a second user
106—Memory
108—Transaction Server
110—Verification code generation module
112—Verification code checking module
112*a*—Comparator
112*b*—Extractor module
112*c*—Authorization module
114—Registration module
116—Login module
118—Notification module

DETAILED DESCRIPTION

Embodiments of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "including," and "having," are open ended transitional phrases and therefore specify the presence of stated features, integers, steps, operations, elements and/or components, but do not forbid the presence or addition of one or more other features, integers, steps, operations, elements, components, and/or groups thereof. The particular order of steps disclosed in the method and process of the present disclosure is not to be construed as necessarily requiring their performance as described or illustrated. It is also to be understood that additional or alternative steps may be employed.

As used herein, the term "and/or" includes any and all combinations of one or more of the associated listed elements.

Typically, point-of-sale or automatic teller machine (ATM) based payment systems require users to use their credit/debit/pre-paid cards to carry out monetary transactions. Similarly, internet-based or e-commerce payment systems require users to use their financial information (such as bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs) to carry out monetary transactions. Internet-based transactions provide a person with remote access to his/her financial account and enable the person to carry out a transaction without walking into a bank and without using paper-based transaction methods.

However, a user performing a point-of-sale (POS), an ATM-based, or an e-commerce transaction is required to insert his payment card into a machine or enter his/her financial accounts at an application interface or a merchant's website. Similarly, a user performing a peer-to-peer online transaction using a service is required to enter a login ID and account information of sender and receiver at the service's application interface. Further, the user has to enter the financial information in all the websites or interfaces where he/she wishes to carry out the transaction. Further, these websites/interfaces may save some of the financial accounts such as card numbers either directly or as token, even to store the card as token in card on file service, the customer has to enter complete card details at least once on the websites, where the data can be stolen or misused. This exposes the user's financial data to merchants and third-party service providers and increases the risk of transactional fraud. Further, the major drawback of internet-based transactions is that confidential information including the bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs are transmitted through public internet networks. Such transmissions are often prone to various types of hacking attacks or misuse of due to which the confidentiality of the financial information is liable to be compromised.

In order to address the aforementioned problems, the present disclosure envisages a system (hereinafter referred to as "system 100") for facilitating secure transaction processing and a method thereof (hereinafter referred to as "method 200"). The system 100 and method 200 are now being described with reference to FIG. 1 through FIG. 4J.

Referring to FIG. 1, the system 100 comprises a payment application 102 (also referred to as "HydePay™ App"), a memory 106, and a transaction server 108 (also referred to as "HydePay™ Server") hosting the payment application 102. The payment application 102 can be a mobile application or a web application. The payment application 102 is executed in the electronic device 10 such as a mobile phone, a tablet, a computer, a laptop, and any other electronic device capable of processing data to access financial products, services, or information located on the server 108 and memory 106. Upon execution, the payment application 102 is configured to provide a first user interface 104 to facilitate users to register and add financial accounts with the transaction server 108 for carrying out secure payment transactions. The payment application 102 is configured to facilitate a registered user to tokenize the financial accounts by means of a tokenization platform.

In an embodiment, for facilitating the registration of a user, the payment application 102 is configured to prompt the user to enter registration details via the first user interface 104. The registration details comprise the personal details and financial accounts of the users. The personal details can be selected from the group consisting of, but are not limited to, name, mobile number, email ID, and identity-related information such as photograph, Permanent Account Number, and date of birth. The financial accounts can be selected from the bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs, and/or token of financial accounts. Upon receiving the registration details, the payment application 102 is configured to send the received details to the transaction server 108.

The memory 106 is configured to store a database having a first lookup table, the first lookup table comprising a list of user identifiers associated with the registered users and registration details corresponding to each of the registered users, the registration details comprising personal details, the financial accounts of the registered users and token of the financial accounts.

In one embodiment, the memory 106 is implemented as a storage area on the transaction server 108. Alternatively, the memory 106 is implemented as an independent storage device communicatively coupled to the transaction server 108.

The transaction server 108 hosting the payment application 102.

The transaction server 108 includes a verification code generation module 110, verification code checking module 112, and a notification module 118.

The verification code generation module 110 is configured to generate a first one-time verification code/PIN for the financial accounts or the token of the financial accounts based on each received transaction request and store both into a second lookup table, the verification code generation module 110 further configured to send the first one-time verification code/PIN to the payment application 102 to display it via the first user interface 104.

The verification code checking module 112 includes a comparator 112a, an extractor module 112b, and an authorization module 112c.

The comparator 112a is configured to receive a second verification code/PIN entered via a second user interface 20 and compare the first one-time verification code/PIN with the second verification code/PIN from the second lookup table. The second user interface 20 can be a merchant's website or the user interface of the payment application 102 executed in the electronic device of another user (e.g., a second registered user/beneficiary of the transaction).

The extractor module 112b is configured to extract the financial accounts or the token stored against the first one-time verification code/PIN and send the financial account data or token data to an acquirer bank 40 or a payment gateway for approval, further the acquirer bank 40 or the payment gateway sends transaction details to the payment application 102 of the registered user.

The authorization module 112c is configured to cooperate with the extractor module 112b to send a transaction request comprising of a transaction details to the payment application 102 of the registered user to verify the transaction by swiping left or right or via biometric or application PIN, and further configured to send the status of the transaction verification to the payment gateway or the acquirer bank 40 and further the payment gateway or the acquirer bank 40 sends the transaction to the issuing bank 30 for approval. And/or the acquirer bank 40 or payment gateway sends transaction details to issuing bank 30, wherein the issuing bank 30 sends an OTP for transaction request to the registered user of the bank to approve the transaction, wherein the register user approves the transaction by entering the OTP on payment gateway and the payment gateway or acquirer bank 40 sends the status of the transaction to the authorization module 112c.

The notification module 118 is configured to cooperate with the authorization module 112c to receive the approved transaction status on the payment application 102 of the registered user.

In one embodiment, the personal details are selected from the group consisting of name, mobile number, email ID, and identity-related information.

In one embodiment, the financial accounts are selected from the group consisting of bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs, and/or token of financial accounts.

In an embodiment, the transaction server 108 facilitates a user to register with the server 108 as a customer or a merchant. In an embodiment, the transaction server 108 is configured to maintain the customer registration details and the merchant registration details in different memory devices. In another embodiment, the transaction server 108 is configured to maintain the customer registration details and the merchant registration details in the same memory device. The identifier generated against each of the registration details is unique. In an embodiment, the identifier is indicative of—(i) whether the registered user is a customer or a merchant or both, and (ii) identity of the customer or the merchant to which the registration details correspond.

In an embodiment, the transaction server 108 comprises a registration module 114 is configured to receive the registration details from the users via the first user interface 104 and further configured to register the users by creating unique identifiers associated with the users and storing the registration details with the unique user identifiers in the first lookup table.

In an embodiment, the registration module 114 is configured to store the registration details in an encrypted form by means of an encryption engine. The transaction server 108 comprises a login module 116 is configured to facilitate a user to generate and set login credentials via the first user interface 104, and further configured to perform authentication of the registered user based on the login credentials before allowing the registered user to use the payment application 102 to initiate the payment transaction.

In an embodiment, the login credentials may be selected from the group consisting of a login ID and password, a pre-set PIN, and a biometric signature of the registered user including at least one of fingerprint, facial biometrics, iris pattern, retina pattern, finger vein pattern, palm vein pattern, and voice sample. For example, in one embodiment, the transaction server 108 may facilitate the registered user to generate or set a login ID and password and use the login ID and password as a credential to securely login into the payment application 102. In another embodiment, the transaction server 108 may perform authentication (i.e., facilitate secure login) by verifying/checking a pre-set secure PIN entered by the registered user or by identifying a biometric trait/feature of the registered user.

In an embodiment, the transaction data comprises a register user identifier, at least one of a transaction identifier, the financial account of the registered user, the transaction amount, details of the online/offline merchant or ATM or one or more registration details of a second registered user with whom the payment transaction is being performed.

In an embodiment, the notification module 118 is configured to receive a transaction status message from the payment gateway or acquirer bank 40 of the second registered user and further configured to notify the registered user and the second registered user about the status of transaction via the first user interface 104 and the second user interface 20 respectively.

In an embodiment, the system facilitates the user to securely perform online, e-commerce, point-of-sale merchant, peer-to-peer (P2P), and automatic teller machine (ATM) transactions.

In an embodiment, the memory 106 cooperates with the transaction server 108 to store a database having a first lookup table, the first lookup table comprising a list of user identifiers associated with the registered users and registration details corresponding to each of the registered users, the registration details comprising personal details, the financial accounts of the registered users and token of the financial accounts.

The issuing bank 30 may additionally perform (second-level) user authentication after verifying the transaction data/the financial accounts of the registered user. The acquirer bank 40 or payment gateway sends transaction details to issuing bank 30, wherein the issuing bank 30 sends an OTP for transaction request to the registered user of the bank to approve the transaction, wherein the register user approves the transaction by entering the OTP on payment gateway and the payment gateway or Thus, the first-level authentication will be facilitated/performed by the transaction server 108 and the second-level authentication will be performed by the acquirer bank 40.

Advantageously, the registration module 114, the login module 116, the verification code generation module 110, the verification code checking module 112, the notification module 118, may be implemented using one or more processor(s) of the transaction server 108. The processor may be a general-purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random-access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth.

The present invention further discloses the method 200 for facilitating secure transaction processing. Referring to FIGS. 2A and 2B, the method 200 comprises the following steps:

At step 202, facilitating, via a first user interface 104 of a payment application 102, users to register and add financial accounts for carrying out secure payment transactions upon execution in an electronic device 10.

At step 204, facilitating, via the first user interface 104 of a payment application 102, the registered user to tokenize the financial accounts by means of a tokenization platform.

At step 206, storing, in a memory 106, a database having a first lookup table, the first lookup table comprising a list of identifiers associated with registered users and the registration details corresponding to each of the registered users, the registration details comprising personal details and financial accounts of the registered users and token of the financial accounts.

At step 208, generating, by the verification code generation module 110 of a transaction server 108, a first one-time verification code/PIN for the financial accounts or the token of the financial accounts based on the each received transaction request and storing both into a second lookup table.

At step 210, sending, by the verification code generation module 110 of the transaction server 108, the first one-time verification code/PIN to the payment application 102 for displaying it on the first user interface 104.

At step 212, receiving, by a verification code checking module 112 of the transaction server 108, a second verification code/PIN entered via a second user interface 20.

At step 214, comparing, by a comparator 112a of the verification code checking module 112, the first one-time verification code/PIN with the second verification code/PIN from the second lookup table.

At step 216, extracting, by an extractor module 112b of the verification code checking module 112, the financial accounts or the token stored against the first one-time verification code/PIN.

At step 218, sending, by the extractor module 112b of the verification code checking module 112, the financial account data or token data to an acquirer bank 40 or a payment gateway for approval, the acquirer bank 40 or the payment gateway sending transaction details to the payment application 102 of the registered user.

At step 220, sending, by an authorization module 112c of the verification code checking module 112, a transaction request comprises a transaction details to the payment application 102 of the registered user to verify the transaction by swiping left or right or via biometric or application PIN.

At step 222, sending, by an authorization module 112c of the verification code checking module 112, status of the transaction verification to the payment gateway or the acquirer bank 40 and further the payment gateway or acquirer bank 40 sending the transaction to the issuing bank 30 for approval.

At step 224, sending, by the acquirer bank 40 or payment gateway send transaction details to issuing bank 30, wherein the issuing bank 30 sends an OTP for transaction request to the registered user of the bank to authorize the transaction and register user approves the transaction by entering the OTP on payment gateway and the payment gateway or acquirer bank sends the status of the transaction to the authorization module.

At step 226, receiving, by a notification module 118 the approved transaction status on the payment application 102 of the registered user.

In an embodiment, the step 202 of facilitating, via the first user interface 104, users to register for carrying out secure payment transactions comprises:

receiving, by a registration module 114 of the transaction server 108, the registration details from the users via the first user interface 104; and registering, by the registration module 114, the users by creating unique identifiers associated with the users and storing the registration details with the unique identifiers in the database.

In an embodiment, the storing the registration details in an encrypted form by means of encryption engine.

In an embodiment, the method 200 further comprises:

facilitating, by a login module 116 of the transaction server 108, a user to generate and set login credentials via the first user interface 104; and performing, by the login module 116, authentication of the registered user based on the login credentials before allowing the registered user to use the first user interface 104 to initiate the payment transaction, wherein the login credentials are selected from the group consisting of a login ID and password, a pre-set PIN, and a biometric signature of the registered user including at least one of fingerprint, facial biometrics, iris pattern, retina pattern, finger vein pattern, palm vein pattern, and voice sample.

Additionally, the method 200 further comprising the following steps:

receiving, by the issuing bank 30 of the registered user, the transaction data;

verifying, by the issuing bank 30, the received transaction data based on a pre-stored customer data;

generating, by the issuing bank 30, a first one-time password after verifying the transaction data;

sending, by the issuing bank 30, the generated first one-time password to the electronic device 10 of the registered user of the bank for user authentication;

providing, by the registered user of the bank, to the payment gateway for authentication;

sending, by the payment gateway, the received second one-time password to the issuing bank 30; and comparing, by the issuing bank 30, the generated first one-time password with the second one-time password received from the payment gateway, to authenticate the transaction.

In an embodiment, the method 200 comprises the following steps:

receiving, by a notification module 118 of the transaction server 108, a transaction status message from the payment gateway/acquirer bank 40 of the second registered user; and notifying, by the notification module 118, the registered user and the second registered user about the status of transaction via the first user interface 104 and the second user interface 20 respectively.

In an operative exemplary embodiment, referring to FIG. 3A and FIGS. 4A-4J, a registered customer (i.e., a customer registered with the transaction server 108) uses the payment application 102 to perform a secure transaction with a registered merchant (i.e., a merchant registered with the transaction server 108). To facilitate secure online e-commerce transactions, the transaction server 108 is communicatively coupled with merchant servers 70 of the registered merchants via a communication means. Each merchant server 70 may host an e-commerce website 60.

Figure 4A:
FIGS. 4A-4J illustrate an exemplary customer flow at a merchant's website, in accordance with an embodiment of the present disclosure.
Figure 4B:
Figure 4C:

The registered customer logs in to an e-commerce website 60 of a merchant from an electronic device 50. The e-commerce website 60 provides an interface 20 to the customer to add items to be bought to the shopping cart and click on "checkout" as shown in FIG. 4A. This leads the customer to a checkout page. As shown in FIG. 4B, the page enables the customer to select a payment method for the transaction. The page shows a 'pay by HydePay™' option as one of the options for carrying out the payment transaction. The customer selects the payment option by clicking on the 'pay by HydePay™' option, the customer is led to a payment page, shown in FIG. 4C, where she/he will be prompted to enter a unique verification code/PIN (also referred to as "HydePay™ code/PIN").

Figure 4D:
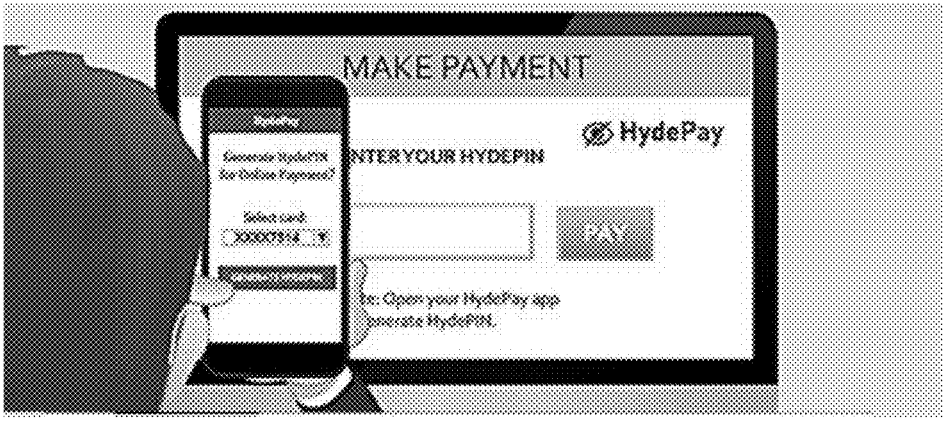
Figure 4E:
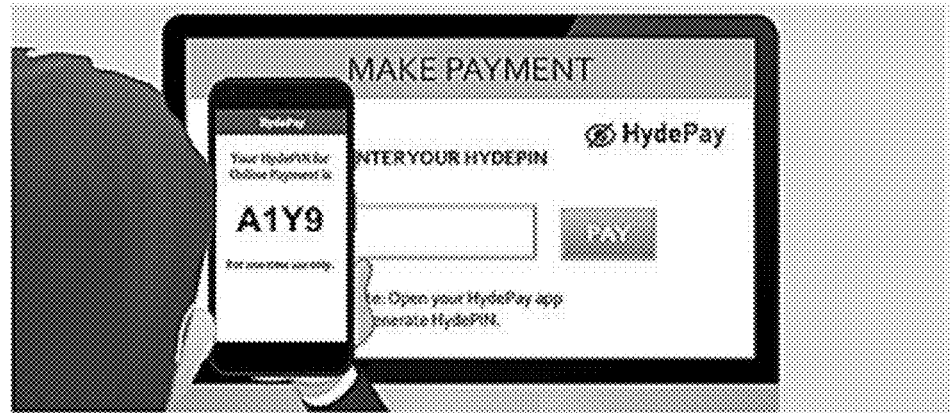
Figure 4F:
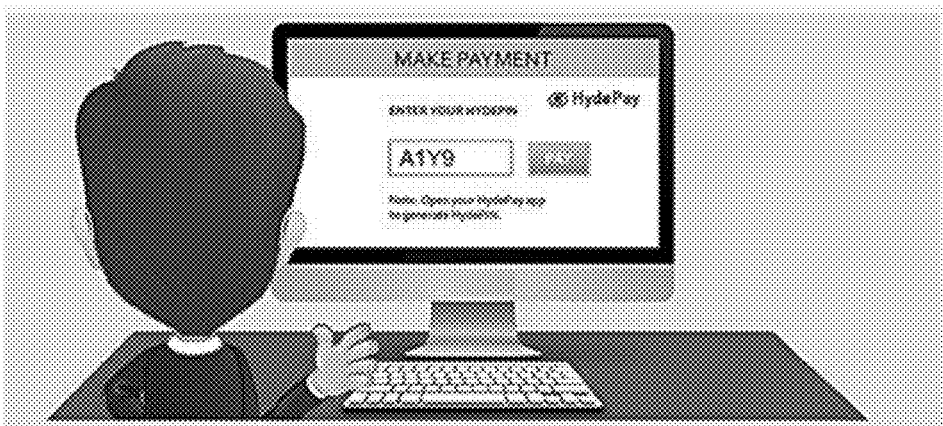

To obtain the unique verification code/PIN, the customer opens the payment application/HydePay™ application 102. The payment application 102 prompts the customer to select a financial account for carrying out the transaction as shown in FIG. 4D. Upon selecting a financial account, the transaction server 108 generates a one-time verification code/PIN (i.e., the first one-time verification code/PIN) for the card and displays the generated code/PIN via the interface 104 of the payment application 102 as shown in FIG. 4E. As shown in FIG. 4F, the customer enters this verification code/PIN (i.e., the second verification code/PIN) on the payment page of the website interface 60.

In an embodiment, the user may authenticate the transaction either by swiping left or right on the desired application platform or by entering the application verification code/PIN or application PIN or by using biometric.

Figure 4G:
Figure 4H:
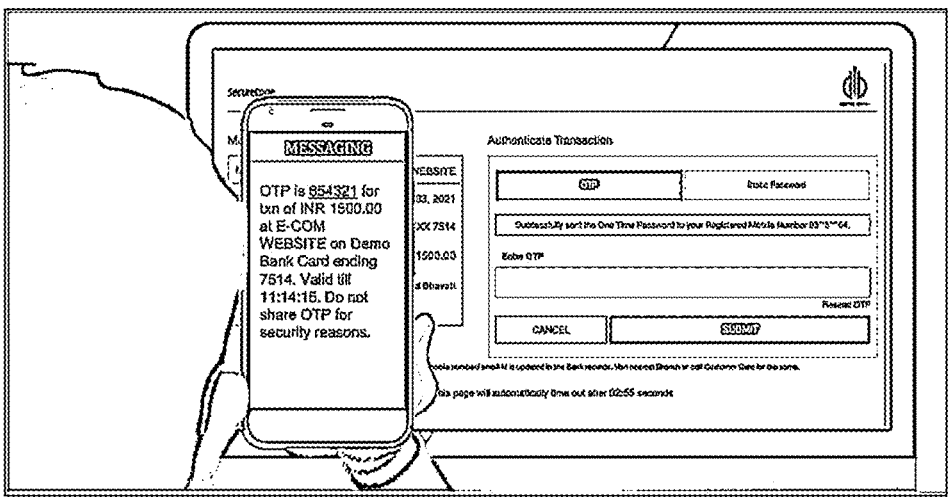
Figure 4I:
Figure 4J:
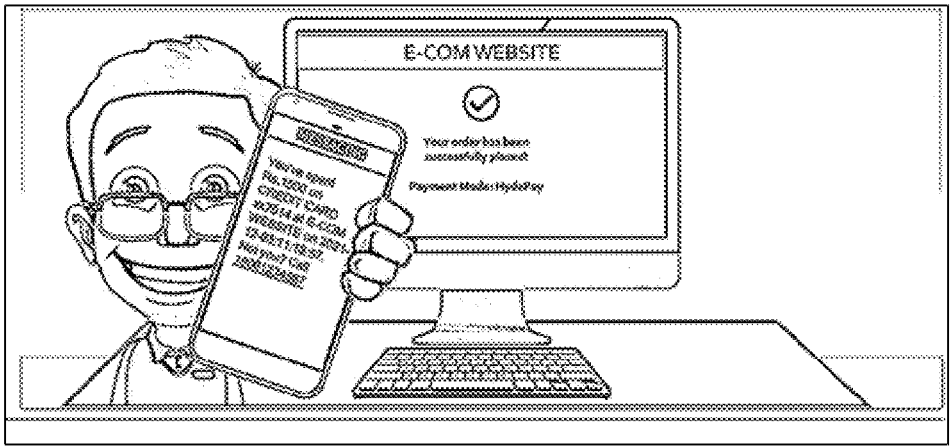

In an alternative embodiment, referring to FIG. 4G, the issuing bank 30 performs an additional authentication before debiting the customer's account. And/or the acquirer bank 40/payment gateway sends transaction details to issuing bank 30, wherein the issuing bank 30 sends an OTP for transaction request to the registered user of the bank to approve the transaction as shown in FIG. 4H. As shown in FIG. 4I, the customer (register user) approves the transaction by entering the OTP on the e-commerce website interface 60. The register user approves the transaction by entering the OTP on payment gateway. The payment gateway and the payment gateway or acquirer bank 40 sends the status of the transaction as shown in FIG. 4J. And/or the issuing bank 30 sends an SMS to the customer to inform the customer about the transaction status.

An exemplary pseudo code depicting implementation of the method 200 for E-commerce payment transaction processing—

```
Do                                          STEP A
{
    customer to add items to be bought to the shopping cart and click on "checkout";
    customer select a payment method for the transaction;
    selects the payment option by clicking on the 'pay by HydePay(™)';
    customer logs into the payment application 102 by entering his/her secure login
    credentials;
}
If (customer login successful == YES)                    STEP B
{
    select a financial account for carrying out the transaction;
    generate a verification code/PIN;
    customer enters the received one-time password on the e-commerce website
    interface;
    click on "Pay" button;
}
Else
{
Login not successful;
GOTO STEP A;
}
    If (verification code/PIN generated by the customer == verification code/PIN entered
in the e-commerce website)                              STEP C
    {
    sends an authorization request to the customer to authorize the transaction by
    swiping right or swiping left;
```

-continued

```
and/or
issuing bank sends an OTP for transaction request to the customer (registered user
of the bank) to approve the transaction;
customer submits OTP on E-commerce website to authenticate the transaction;
}
Else
{
verification code/PIN not matched;
transaction declined;
GOTO STEP B;
}
```

Figure 6A:
FIGS. 6A-6J illustrate an exemplary customer flow at a Peer-to-peer, in accordance with an embodiment of the present disclosure.
Figure 6B:
Figure 6C:
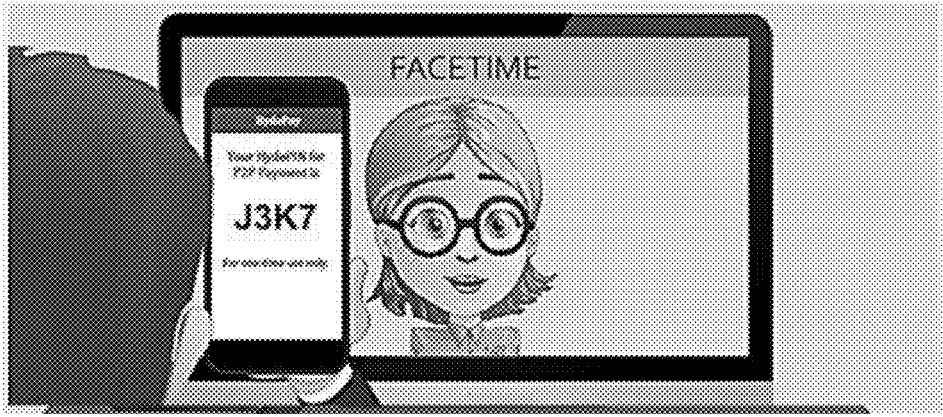
Figure 6D:
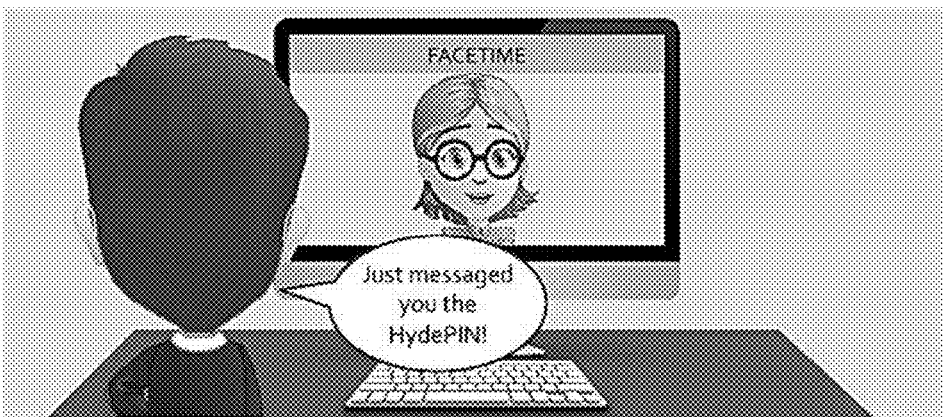
Figure 6E:
Figure 6F:
Figure 6G:
Figure 6H:
Figure 6I:
Figure 6J:

In accordance with another aspect of the present invention, referring to FIG. 3B and FIG. 6A-6J, the system 100 is used for peer-to-peer (P2P) payment transaction processing. In an operative embodiment, a second user requested a payment of amount 'x' and sends the request to the first user as shown in FIG. 6A, the first user logs into the payment application 102 by entering his/her secure login credentials as shown in FIG. 6B. As shown in FIG. 6C, the payment application 102 provides the first user interface 104a to facilitate the first user to select a financial account for carrying out the transaction, and generate a verification code/PIN for the transaction corresponding to the financial account. The first user sends the generated verification code/PIN to the second user via SMS, email, a messaging service (e.g., Whatsapp), or any other communication means as shown on FIG. 6D. To receive the payment, the second user executes the payment application 102 on his/her device 10b. Upon execution, the payment application 102 provides a second user interface 104b to allow the second registered user to log into his/her application 102 by entering secure login credentials. The second registered user enters the verification code/PIN received from the first user on the second user interface 104b of his payment application 102 and enter the amount "x" as shown in FIG. 6E. The second user further sends the authorization request of requested amount 'x' to the first user. The transaction server 108 compares the verification code/PIN generated by the first user with the verification code/PIN received from the second user and approves the transaction if they match. After approval/successful verification, the transaction server 108 sends an authorization request to the first user on his payment application interface 104 to facilitate the first user to authorize the transaction as shown in FIG. 6F. The authorization may be performed using one or more of the methods described herein above. And/or the acquirer bank 40/payment gateway sends transaction details to issuing bank 30, wherein the issuing bank 30 sends an OTP for transaction request as shown in FIG. 6G to the first user/registered user of the bank to approve the transaction as shown in FIG. 6H. The first user entering the OTP on payment gateway for authorising the transaction as shown in FIG. 6I and FIG. 6J.

An exemplary pseudo code depicting implementation of the method 200 for peer-to-peer (P2P) payment transaction processing—

```
Do                                                      STEP A
  {
  a second user requested a payment of amount 'x' and sends the request to the first
  user;
  First user or second user logs into the payment application 102 by entering his/her
  secure login credentials;
  }
If (first user login successful == YES)                 STEP B
  {
  select a financial account for carrying out the transaction;
  generate a verification code/PIN for the transaction;
  first user sends the generated verification code/PIN to the second user;
  }
Else
  {
Login not successful;
GOTO STEP A;
  }
  If (second user login successful == YES)              SETP C
  {
  second registered user enters the verification code/PIN received from the first user;
  second user enters the amount 'x';
  second user sends the authorization request of requested amount 'x' to the first user;
  }
Else
  {
Login not successful;
GOTO STEP A;
  }
  If (first user receives the request from second user)
  {
  first user to authorize the transaction by swiping right or swiping left;
  And/or
  issuing bank sends an OTP for transaction request to the first user (registered user of
  the bank) to approve the transaction;
```

-continued

---

First user submits OTP on the payment gateway for authorising the transaction;
}
Else
{
transaction declined;
}

---

Figure 5A:
FIGS. 5A-5G illustrate an exemplary customer flow at a merchant's POS, in accordance with an embodiment of the present disclosure.
Figure 5B:
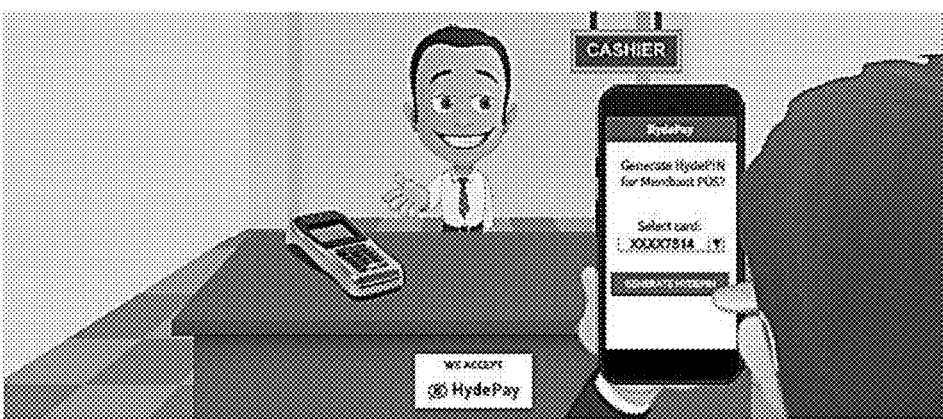
Figure 5C:
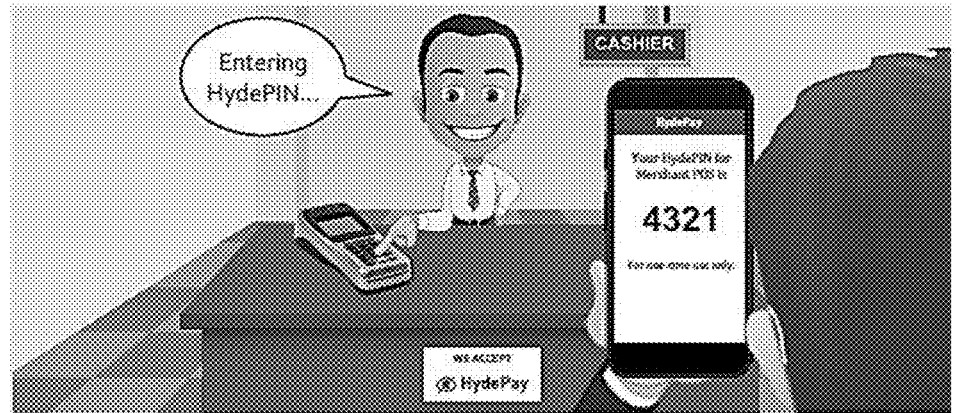
Figure 5D:
Figure 5E:
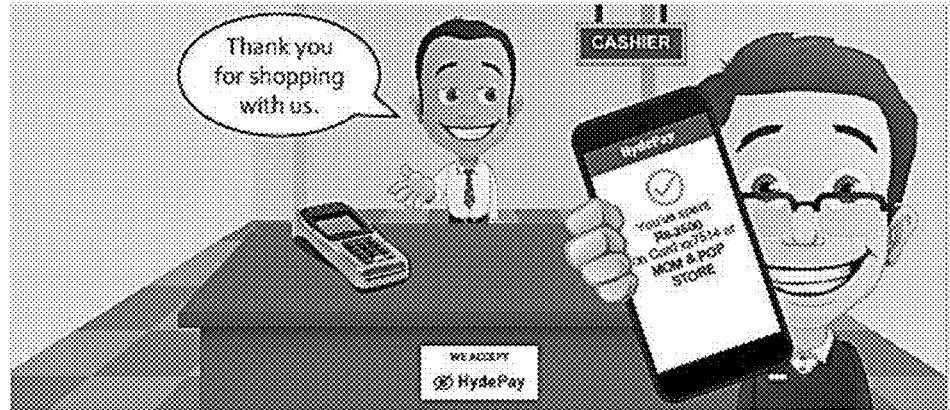
Figure 5F:
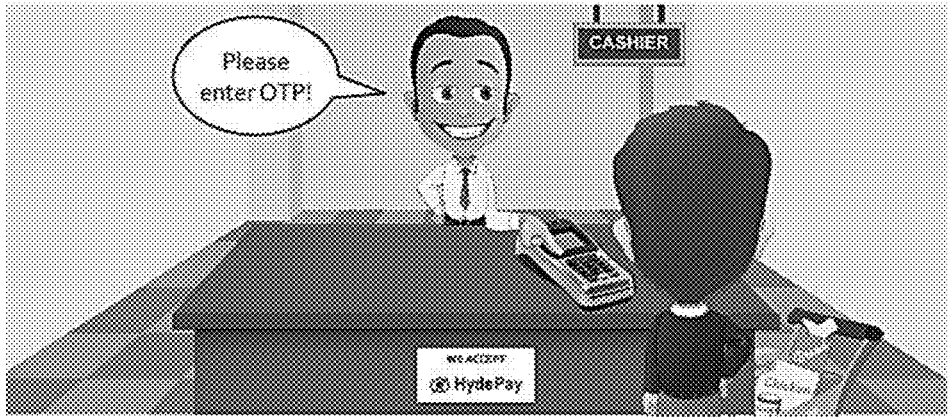
Figure 5G:
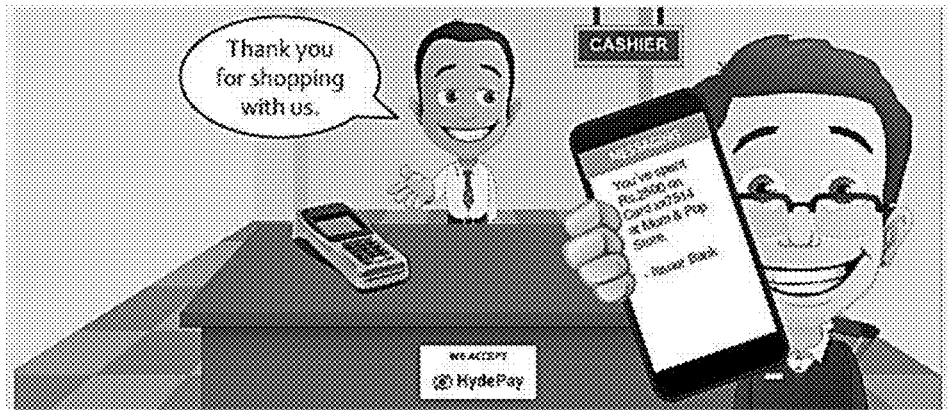

In accordance with still another aspect of the present invention, referring to FIG. 5A-5G, the system 100 is used for transaction processing at a retail shop. In an operative embodiment, a customer wishing to make a payment of 'x' amount to a vendor using the HydePay™ app/payment application 102 logs into the application 102 by entering his/her secure login credentials. The vendor creates a bill for the goods purchased by the customer and ask to the customer to pay the bill as shown in FIG. 5A. Thereafter, the customer selects a financial account for carrying out the transaction, and generates a verification code/PIN for the transaction corresponding to the financial account as shown in FIG. 5B and 5C. The customer then shares the verification code/PIN facilitate the customer to authorize the transaction as shown in FIG. 5D and FIG. 5E. The authorization may be performed using one or more of the methods described herein above. And/or the acquirer bank 40 or payment gateway sends transaction details to issuing bank 30, wherein the issuing bank (30) sends an OTP for transaction request to the customer (registered user) of the bank to approve the transaction as shown in FIG. 5F, wherein the customer (register user) approves the transaction by entering the OTP on payment gateway of the vendor as shown in FIG. 5G.

An exemplary pseudo code depicting implementation of the method 200 for processing at a retail shop—

---

```
Do                                                    STEP A
{
vendor create bill and request for verification code/PIN;
customer logs into the payment application 102 by entering his/her secure login
credentials;
}
If (customer login successful == YES)                 STEP B
{
generate a verification code/PIN;
customer then shares the verification code/PIN with the vendor;
}
Else
{
Login not successful;
GOTO STEP A;
}
If (vendor login successful == YES)                   STEP C
{
enters the verification code/PIN shared by the customer;
enter the amount 'x';
}
Else
{
Login not successful;
GOTO STEP A;
}
While (customer received payment request from vendor)
{
sends an authorization request to the customer on his payment application interface
104 to facilitate the customer to authorize the transaction by swiping right or swiping
left;
And/or
issuing bank sends an OTP for transaction request to the customer (registered user)
of the bank to approve the transaction;
customer (register user) approves the transaction by entering the OTP on payment
gateway of the vendor;
}
```

--- with the vendor. To receive the payment, the vendor logs into his payment application 102 by entering secure login credentials. The vendor then enters the verification code/PIN shared by the customer on the interface 104 of the payment application 102 and enters the amount 'x' as shown in FIG. 5C. The transaction server 108 compares the verification code/PIN generated by the customer with the verification code/PIN received from the vendor and approves the transaction if they match. After approval/successful verification, the transaction server 108 sends an authorization request to the customer on his payment application interface 104 to In an embodiment, the transaction of the desired amount may be carried out by using Hydepin, wherein the Hydepin is required to be entered in the ATM interface and select or enter the desired amount to be withdrawn.

Figure 7A:
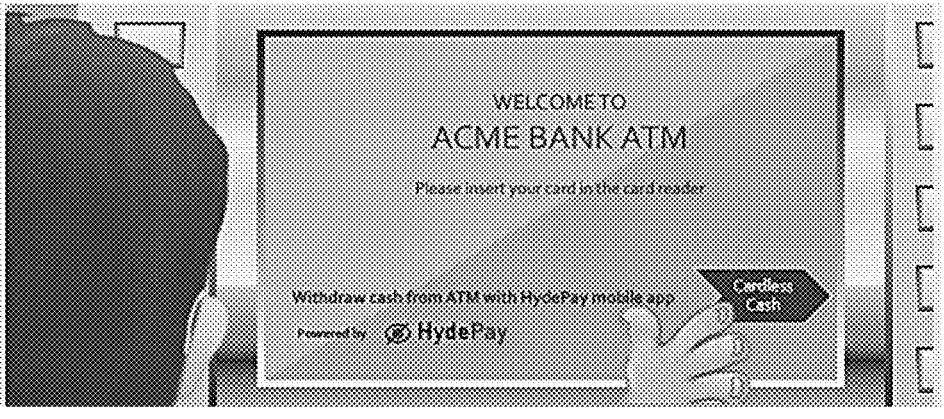
FIGS. 7A-7H illustrate an exemplary customer flow at an ATM, in accordance with an embodiment of the present disclosure.

In accordance with yet another aspect of the present invention, referring to FIG. 7A-7H, the system 100 is used for processing transactions associated with an automatic teller machine (ATM). The transaction server 108 is communicatively coupled to the ATM processing systems to facilitate transactions via the payment application/Hyde-Pay™ app 102. In an operative embodiment, a registered user wishing to withdraw an 'x' amount from the ATM using the HydePay™ app/payment application 102 selects a "withdraw using HydePay™" option on the ATM interface as shown in FIG. 7A. Upon choosing this option, the ATM transaction by entering the OTP on ATM interface. An exemplary pseudo code depicting implementation of the method 200 for processing at an automatic teller machine (ATM)—

Figure 7B:
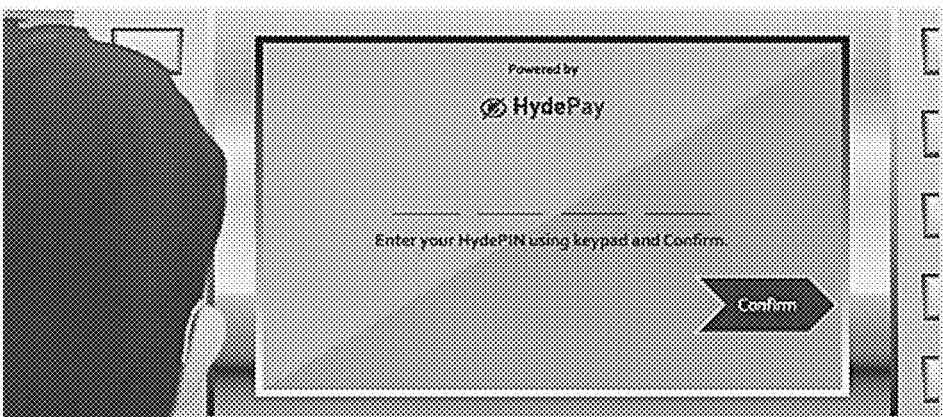
Figure 7C:
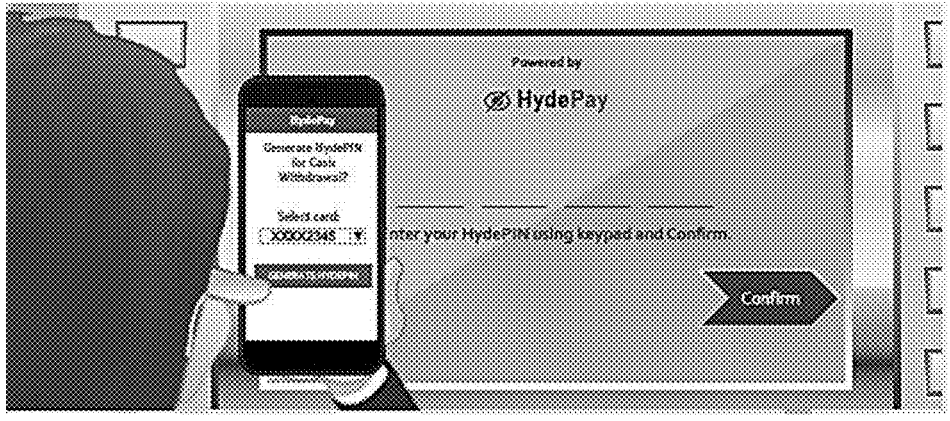
Figure 7D:
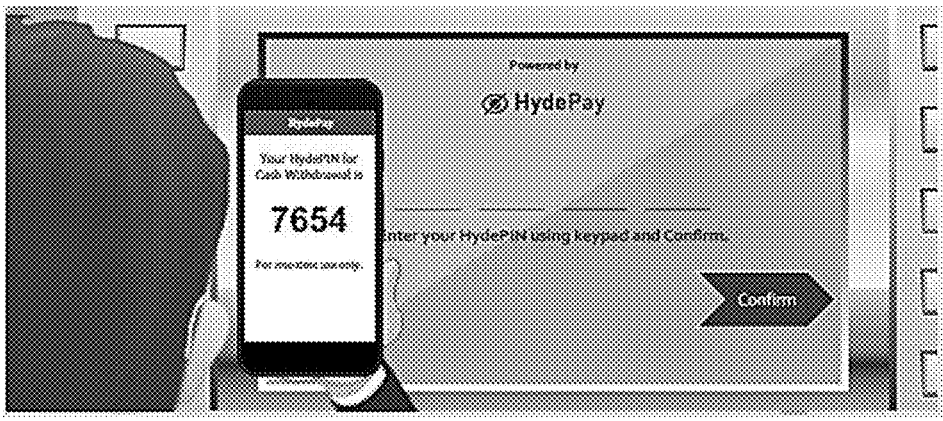
Figure 7E:
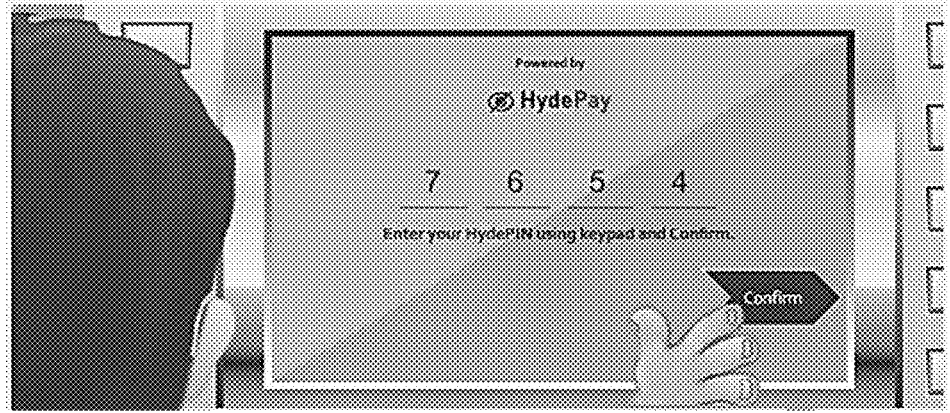
Figure 7F:
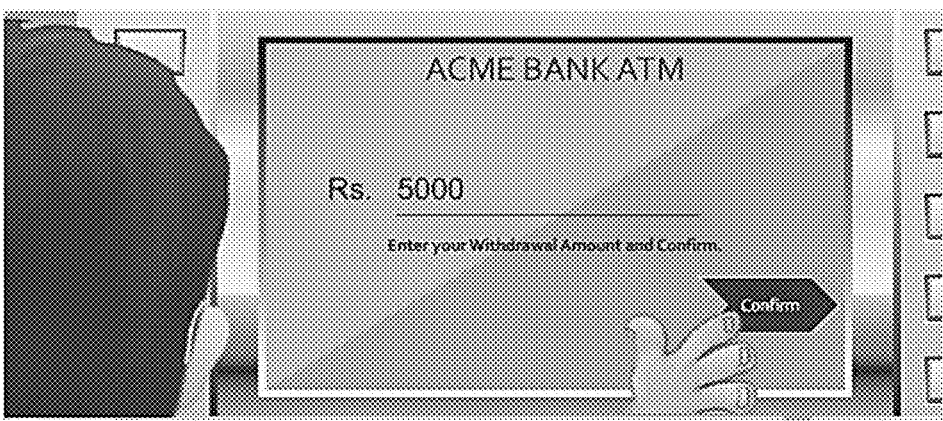
Figure 7G:
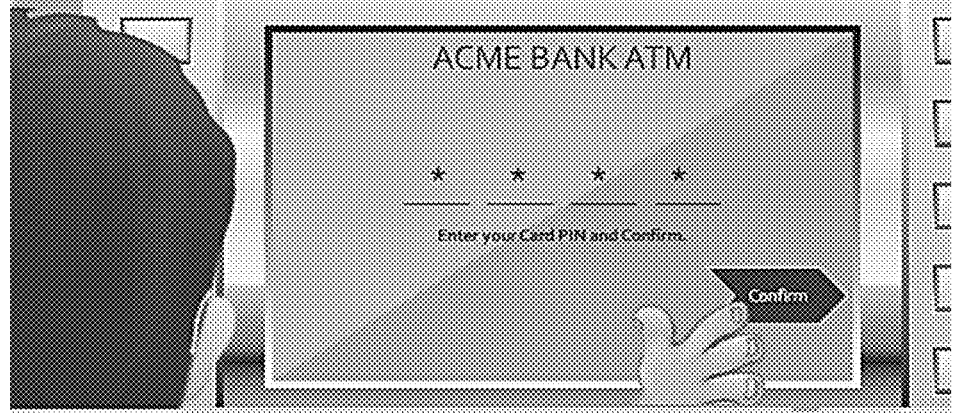
Figure 7H:
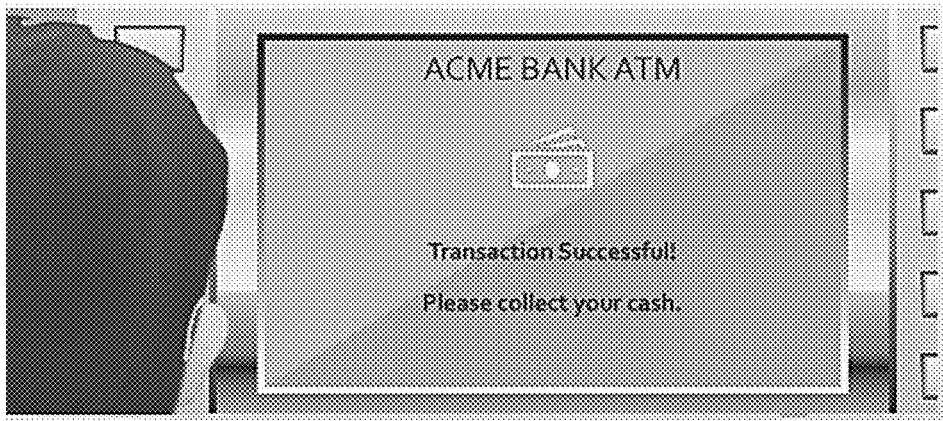

```
Do                                                      STEP A
    {
    customer logs into the payment application 102 by entering his/her secure login
credentials;
    }
If (customer login successful == YES)                   STEP B
    {
    selects a "withdraw using HydePay( ™)" option on the ATM interface;
    generates the verification code/PIN;
    customer enters the transaction amount 'x' to be withdrawn on the ATM interface;
    enter a verification code/PIN for withdrawal on the ATM interface;
    }
Else
    {
Login not successful;
GOTO STEP A;
    }
    If (verification code/PIN generated by the customer == verification code/PIN received
from the ATM interface)                                 STEP C
    {
    approves the transaction if they match;
    }
Else
    {
verification code/PIN not matched;
transaction failed/declined;
GOTO STEP B;
    }
    While (customer received payment request)           STEP D
    {
    sends an authorization request to the customer on his payment application interface
    104 to facilitate the customer to authorize the transaction by swiping right or swiping
    left;
    And/or
    issuing bank sends an OTP for transaction request to the customer (registered user)
    of the bank to approve the transaction;
    customer (register user) approves the transaction by entering the OTP on ATM
    Interface;
    }
``` interface prompts the user to enter a verification code/PIN for withdrawal as shown in FIG. 7B. For obtaining the verification code/PIN, the user logs into the payment application 102 by entering his/her secure login credentials. Thereafter, the user enters, selects a financial account for carrying out the transaction, and generates a verification code/PIN for the withdrawal transaction corresponding to the financial account as shown in FIG. 7C and FIG. 7D. The user then enters the verification code/PIN on the ATM interface as shown in verification code/PIN. The user enters the transaction amount 'x' to be withdrawn on the ATM interface and enters the verification code/PIN as shown in FIG. 7F and FIG. 7G. The transaction server 108 compares the verification code/PIN generated by the user on the payment application 102 with the verification code/PIN received from the user via the ATM interface and approves the transaction if they match as shown on FIG. 7H. After approval/successful verification, the transaction server 108 sends an authorization request to the customer on his payment application interface 104 to facilitate the customer to authorize the transaction. The authorization may be performed using one or more of the methods described herein above. And/or the acquirer bank 40 or payment gateway sends transaction details to issuing bank 30, wherein the issuing bank 30 sends an OTP for transaction request to the customer (registered user) of the bank to approve the transaction, wherein the customer (register user) approves the In accordance with another aspect of the invention, the system 100 is used for transaction processing at a traditional retail merchant outlet having a point-of-sale system. The merchant may not have the payment application/HydePay™ app 102 or may not know how to use the payment application 102. In this case, the merchant is issued a payment card (also referred to as "HydePay™ card") to accept payments from the customers. In an operative embodiment, a registered customer wishing to make a payment of 'x' amount to a merchant using the HydePay™ app/payment application 102 logs into the payment application 102 by entering his/her secure login credentials. Thereafter, the customer selects a financial account for carrying out transaction, and generates a verification code/PIN for the transaction corresponding to the financial account. The customer shares the verification code/PIN with the merchant. To receive the payment, the merchant inserts his HydePay™ card into the point-of-sale (POS) machine. The POS machine is configured to recognize the HydePay™ card and prompt the merchant to enter a verification code/PIN and merchant enter the amount 'x'. The merchant then enters the verification code/PIN shared by the customer and enter the amount 'x' on the interface of the POS machine. The POS machine then sends the received verification code/PIN to the transaction server 108 either directly or through the merchant/acquirer server. The transaction server 108 compares the verification code/PIN generated by the customer with the verification code/PIN received from the merchant and approves the transaction if the two codes/PINs match. After approval/successful verification, the transaction server 108 sends a transaction request comprising of transaction details to the payment application 102 of the registered user to verify the transaction by swiping left or right or via biometric or application PIN, or the acquirer bank 40/payment gateway sends transaction details to issuing bank 30, wherein the issuing bank 30 sends an OTP for transaction request to the registered user of the bank to approve the transaction, wherein the register user approves the transaction by entering the OTP on POS interface and the payment gateway or acquirer bank 40 sends the status of the transaction to the authorization module 112*c*.

In accordance with still another aspect of the present invention, the system 100 is used to store the card details in an online platform as per the rules and regulations declared by the governing authorities of the stipulated countries and tokenize it for the transaction.

An exemplary pseudo code depicting implementation of the method 200 for processing at a traditional retail merchant outlet having a point-of-sale system—

The system 100 facilitates the customer to perform online, e-commerce, point-of-sale merchant, and ATM transactions without having to reveal any financial accounts such as bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs at any point and in any form to a third-party service, an application interface, or the merchant (e.g., via the e-commerce website) during the transaction. When the system 100 is used for carrying out payment transactions with the merchant, the customer is required to reveal only a verification code/PIN (HydeCode/PIN) to the merchant. In other words, the customer uses a HydePay™ app to "hide" the financial accounts from merchant and instead of financial accounts, the customer only enters a one-time HydeCode™/PIN on the merchant website. The payment application 102 (i.e., HydePay™ app) also allows registered customers to securely tokenize their financial accounts and store the token in the second lookup table and to dynamically generate

```
Do                                             STEP A
    {
    customer logs into the payment application 102 by entering his/her secure login
    credentials;
    }
If (customer login successful == YES)          STEP B
    {
    select a financial account;
    generate a verification code/PIN;
    customer shares the verification code/PIN with the merchant;
    }
Else
    {
Login not successful;
GOTO STEP A;
    }
Do                                             STEP C
    {
    Insert HydePay( ™) card into the point-of-sale (POS) machine;
    }
If (HydePay( ™) card == valid and recognized)       STEP D
    {
    prompt the merchant to enter a verification code/ PIN;
    merchant then enters the verification code/PIN shared by the customer and enter the
    amount 'x';
    }
Else
    {
    HydePay( ™) card not valid;
    verification code/PIN not matched;
    transaction failed/declined;
GOTO STEP C;
    }
    If (verification code/PIN generated by the customer == verification code/PIN received
from the merchant)                             STEP E
    {
    sends an authorization request to the customer to authorize the transaction by
    swiping right or swiping left;
    and/or
    issuing bank sends an OTP for transaction request to the customer (registered user
    of the bank) to approve the transaction;
    customer submits OTP on POS interface to authenticate the transaction;
    }
Else
    {
verification code/PIN not matched;
transaction failed/declined;
GOTO STEP D;
    }
``` unique verification codes/PINs (i.e., HydeCodes/PINs) for carrying out peer-to-peer (P2P), person-to-merchant (P2M) or ATM transactions. This ensures full-proof security and reduced the risk of fraud on payment transactions.

In an embodiment, the system 100 can be integrated with any of the nationalized and internationalized banking applications, mobile wallets, or payment applications.

The communication means described herein may refer to a means for transmitting and receiving electronic data. The communication means may include, for example, the Internet, the World Wide Web, an intranet, cable (including fiber optic cable), magnetic communications, electromagnetic communications (including RF, microwave, and infrared communications), and electronic communications. Wireless communication means can support various wireless communication network protocols and technologies such as Near Field Communication (NFC), Wi-Fi, Bluetooth, 4G Long Term Evolution (LTE), Code Division Multiplexing Access (CDMA), Universal Mobile Telecommunication System (UMTS) and Global System for Mobile Telecommunication (GSM).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

Technical Advancements

The present disclosure described herein above has several technical advantages including, but not limited to, the realization of a system for secure transaction processing and method thereof that:

do not require a user to enter financial accounts (bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs) to carry out a payment transaction;

offer the user a safe and convenient way of performing online or offline or peer-to-peer transactions;

enable users to perform online or offline transactions at a point-of-sale (POS) machine or an automatic teller machine (ATM) without using a financial account;

reduce the likelihood of exposure to hacking attacks;

avoid unauthorized payment transactions;

offers a high payment success rate;

offers a convenient way for making payments;

offers a user friendly interface for making payment; and provide secure payment interface for easy and instant transaction.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A system (100) for facilitating secure transaction, said system (100) comprising:

1. a payment application (102) configured to provide a first user interface (104), upon execution in an electronic device (10), to facilitate users to register and add financial accounts for carrying out secure payment transactions, said payment application (102) further configured to facilitate a registered user to tokenize said financial accounts by means of a tokenization platform;

2. a memory (106) configured to store a database having a first lookup table in an encrypted form, the first lookup table comprising a list of user identifiers associated with the registered users and registration details corresponding to each of the registered users, the registration details comprising personal details, the financial accounts of the registered users and tokens of said financial accounts;

3. a transaction server (108) hosting said payment application (102), said transaction server (108) comprising:

a verification code generation module (110) configured to:

receive a transaction request associated with a first registered user and a second registered user out of the registered users, wherein said transaction request is initiated by the first registered user by selecting a specific payment method via a second user interface (20) associated with a payment receiving application of said second registered user, wherein said second user interface (20) subsequently prompts the first registered user to enter a verification code/PIN;

in response to the first registered user opening the payment application (102) and selecting a financial account via the first user interface (104) of the payment application (102), generate a unique, temporary, first one-time verification code/PIN for said selected financial account or said selected token and store both the first one-time verification code/PIN and a corresponding user identifier into a second lookup table, wherein the second lookup table is configured to delete the stored verification code/PIN after a predetermined time period or after a single successful use; and transmit said first one-time verification code/PIN to said payment application (102) to display it via said first user interface (104); and a verification code checking module (112) comprising:

a comparator (112a) configured to receive a second verification code/PIN entered by said first registered user via said second user interface (20) and compare said second verification code/PIN with said first one-time verification code/PIN from said second lookup table;

an extractor module (112b) configured to, only upon a positive comparison result, extract said selected financial account or said selected token stored against the first one-time verification code/PIN and automatically send data related to said selected financial account or said selected token to an acquirer bank (40) or a payment gateway, bypassing said second user interface (20) and preventing exposure of the financial account data to said second registered user associated with the second user interface (20), for approval, further said acquirer bank (40) or said payment gateway sends transaction details to said payment application (102) of the first registered user;

an authorization module (112c) configured to cooperate with said extractor module (112b) to send a transaction request comprising of a transaction details to said payment application (102) of the first registered user to verify the transaction by swiping left or right or via biometric or application PIN, and further configured to send the status of the transaction verification to said payment gateway or said acquirer bank (40) and further said payment gateway or said acquirer bank (40) sends said transaction to the issuing bank (30) for approval, and/or said acquirer bank (40) or payment gateway sends transaction details to issuing bank (30), wherein said issuing bank (30) sends an OTP for transaction request to the first registered user of the bank to approve the transaction, wherein said first register user approves the transaction by entering the OTP on payment gateway and said payment gateway or acquirer bank (40) sends the status of the transaction to said authorization module (112c); and a notification module (118) configured to cooperate with said authorization module (112c) to receive said approved transaction status on said payment application (102) of the first registered user.

2. The system (100) as claimed in claim 1, wherein said memory (106) is implemented as a storage area on said transaction server (108) or an independent storage device communicatively coupled to said transaction server (108).

3. The system (100) as claimed in claim 1, wherein said personal details are selected from the group consisting of name, mobile number, email ID, and identity-related information.

4. The system (100) as claimed in claim 1, wherein said financial accounts are selected from the group consisting of bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs, and/or token of financial accounts.

5. The system (100) as claimed in claim 1, wherein said transaction server (108) comprises a registration module (114) configured to receive said registration details from the users via said first user interface (104), and further configured to register the users by creating unique identifiers associated with the users and storing the registration details with said unique user identifiers in said first lookup table.

6. The system (100) as claimed in claim 5, wherein said registration module (114) is configured to store the registration details in an encrypted form by means of an encryption engine.

7. The system (100) as claimed in claim 1, wherein said transaction server (108) further comprises a login module (116) configured to facilitate a user to generate and set login credentials via said first user interface (104), and further configured to perform authentication of the registered user based on said login credentials before allowing the registered user to use said application (102) to initiate said payment transaction.

8. The system (100) as claimed in claim 7, wherein said login credentials are selected from the group consisting of a login ID and password, a pre-set PIN, and a biometric signature of the registered user including at least one of fingerprint, facial biometrics, iris pattern, retina pattern, finger vein pattern, palm vein pattern, and voice sample.

9. The system (100) as claimed in claim 1, wherein said transaction data comprises a register user identifier, at least one of a transaction identifier, the financial account of the registered user, the transaction amount, details of online/offline merchant or ATM or one or more registration details of said second registered user with whom the payment transaction is being performed.

10. The system (100) as claimed in claim 1, wherein said notification module (118) configured to receive a transaction status message from the payment gateway or acquirer bank (40) of the second registered user and further configured to notify the registered user and the second registered user about the status of transaction via the first user interface (104) and the second user interface (20) respectively.

11. The system (100) as claimed in claim 1, wherein said system facilitates the user to securely perform online, e-commerce, point-of-sale merchant, peer-to-peer (P2P), and automatic teller machine (ATM) transactions.

12. A method (200) for facilitating secure transaction processing, said method (200) comprising the following steps:

1. facilitating (202), via a first user interface (104) of a payment application (102), users to register and add financial accounts for carrying out secure payment transactions upon execution in an electronic device (10);

2. facilitating (204), via said first user interface (104) of a payment application (102), the registered user to tokenize said financial accounts by means of a tokenization platform;

3. storing (206), in a memory (106), a database having a first lookup table in an encrypted form, the first lookup table comprising a list of identifiers associated with registered users and the registration details corresponding to each of the registered users, the registration details comprising personal details and financial accounts of the registered users and token of said financial accounts;

4. receiving, by a verification code generation module (110) of a transaction server (108), a transaction request associated with a first registered user and a second registered user out of the registered users, wherein said transaction request is initiated by the first registered user by selecting a specific payment method via a second user interface (20) associated with a payment receiving application of said second registered user, wherein said second user interface (20) subsequently prompts the first registered user to enter a verification code/PIN;

5. generating (208), by said verification code generation module (110) in response to the first registered user opening the payment application (102) and selecting a financial account via the first user interface (104) of the payment application (102), a unique, temporary, first one-time verification code/PIN for said selected financial account or said selected token and storing both the first one-time verification code/PIN and a corresponding user identifier into a second lookup table, wherein the second lookup table is configured to delete the stored verification code/PIN after a predetermined time period or after a single successful use;

6. sending (210), by said verification code generation module (110), said first one-time verification code/PIN to said payment application (102) for displaying it on said first user interface (104), 7. receiving (212), by a verification code checking module (112) of said transaction server (108), a second verification code/PIN entered via said second user interface (20);

8. comparing (214), by a comparator (112*a*) of said verification code checking module (112), said second verification code/PIN with said first one-time verification code/PIN from said second lookup table;

9. upon successful comparison, extracting (216), by an extractor module (112*b*) of said verification code checking module (112), said selected financial account or said selected token stored against the first one-time verification code/PIN;

10. automatically sending (218), by said extractor module (112*b*) of said verification code checking module (112), data related to said selected financial account or selected token to an acquirer bank (40) or a payment gateway, bypassing said second user interface (20) and preventing exposure of the financial account data to said second registered user associated with the second user interface (20), for approval, said acquirer bank (40) or said payment gateway sending transaction details to said payment application (102) of the first registered user;

11. sending (220), by an authorization module (112*c*) of said verification code checking module (112), a transaction request comprises a transaction details to said payment application (102) of the first registered user to verify the transaction by swiping left or right or via biometric or application PIN;

12. sending (222), by an authorization module (112*c*) of said verification code checking module (112), status of the transaction verification to said payment gateway or said acquirer bank (40), and further said payment gateway or acquirer bank (40) sending said transaction to said issuing bank (30) for approval;

13. sending (224), by said acquirer bank (40) or payment gateway, transaction details to issuing bank (30), wherein said issuing bank (30) sends an OTP for transaction request to the first registered user of the bank to authorize the transaction and the first register user approves the transaction by entering the OTP on payment gateway and said payment gateway or acquirer bank sends the status of the transaction to the authorization module; and 14. receiving (226) by a notification module (118) said approved transaction status on said payment application (102) of the first registered user.

13. The method (200) as claimed in claim 12, wherein said personal details are selected from a group consisting of name, mobile number, email ID, and identity-related information.

14. The method (200) as claimed in claim 12, wherein said financial accounts are selected from the group consisting of bank details, account details, debit card number, prepaid card number, credit card number, card validity details, card verification value (CVV), internet banking login ID, login credentials associated with a financial service account, Virtual Payment Address (VPA)/Unified Payments Interface (UPI) ID, PayPal ID, Zelle ID, and other transaction IDs, and/or token of financial accounts.

15. The method (200) as claimed in claim 12, wherein said step of facilitating (202), via said first user interface (104), users to register for carrying out secure payment transactions comprises the following steps:

receiving, by a registration module (114) of said transaction server (108), the registration details from the users via said first user interface (104); and registering, by said registration module (114), the users by creating unique identifiers associated with the users and storing the registration details with said unique user identifiers in said first lookup table.

16. The method (200) as claimed in claim 12, wherein said storing the registration details in an encrypted form by means of encryption engine.

17. The method (200) as claimed in claim 12, which further comprises the following steps:

facilitating, by a login module (116) of said transaction server (108), a user to generate and set login credentials via said first user interface (104); and performing, by said login module (116), authentication of the registered user based on said login credentials before allowing the registered user to use said first user interface (104) to initiate said payment transaction, wherein said login credentials are selected from the group consisting of a login ID and password, a pre-set PIN, and a biometric signature of the registered user including at least one of fingerprint, facial biometrics, iris pattern, retina pattern, finger vein pattern, palm vein pattern, and voice sample.

18. The method (200) as claimed in claim 12, which further comprises the following steps:

receiving, by the issuing bank (30) of the registered user, said transaction data;

verifying, by the issuing bank (30), the received transaction data based on a pre-stored customer data;

generating, by the issuing bank (30), a first one-time password after verifying the transaction data;

sending, by the issuing bank (30), the generated first one-time password to the electronic device (10) of the registered user of the bank for user authentication;

providing, by the registered user of the bank, to the payment gateway for authentication;

sending, by the payment gateway, the received second one-time password to the issuing bank (30); and comparing, by the issuing bank (30), the generated first one-time password with the second one-time password received from the payment gateway, to authenticate the transaction.

19. The method (200) as claimed in claim 12, which further comprises the following steps:

1. receiving, by a notification module (118) of said transaction server (108), a transaction status message from the payment gateway/acquirer bank (40) of the second registered user; and 2. notifying, by said notification module (118), the first registered user and the second registered user about the status of transaction via the first user interface (104) and the second user interface (20) respectively.

20. The method (200) as claimed in claim 12, wherein said transaction data comprises at least one of a transaction identifier, the financial account of the registered user, the transaction amount, and one or more personal details of the second registered user with whom the payment transaction is being performed.

* * * * *